United States Patent [19]

Hayashi et al.

[11] Patent Number: 5,266,418
[45] Date of Patent: * Nov. 30, 1993

[54] MAGNETIC RECORDING MEDIUM

[75] Inventors: Kazuhiko Hayashi; Akihiko Okabe; Masatoshi Hayakawa; Koichi Aso, all of Kanagawa, Japan

[73] Assignee: Sony Corporation, Tokyo, Japan

[*] Notice: The portion of the term of this patent subsequent to Aug. 28, 2008 has been disclaimed.

[21] Appl. No.: 573,791

[22] Filed: Aug. 28, 1990

[30] Foreign Application Priority Data

Aug. 28, 1989 [JP] Japan ............... 1-221024

[51] Int. Cl.$^5$ ............................................. G11B 5/66
[52] U.S. Cl. .................................. 428/694; 428/611; 428/668; 428/670; 428/900
[58] Field of Search ............... 428/694, 900, 611, 620, 428/629, 637, 641, 655, 668, 670

[56] References Cited

U.S. PATENT DOCUMENTS 4,542,062  9/1985  Takada et al. ............... 428/694
4,647,507  3/1987  Suzuki et al. ............... 428/694
4,661,418  4/1987  Yanai et al. ............... 428/610
4,833,044  5/1989  Takahashi et al. ............... 428/694

FOREIGN PATENT DOCUMENTS 167118  1/1986  European Pat. Off. .
261240  3/1988  European Pat. Off. .
3216863  11/1982  Fed. Rep. of Germany .

Primary Examiner—Paul J. Thibodeau
Assistant Examiner—R. Follett
Attorney, Agent, or Firm—Hill, Steadman & Simpson

[57] ABSTRACT

A magnetic recording medium having a magnetic thin film of a composition expressed as $(Co_a Pt_b M_c^I M_d^{II})Ox$ (where a, b, c, d are atomic percent; and x is weight percent). In this composition, $a+b+c+d=100$, $0<a$, $0<b\leq50$, $0<c\leq20$, $0<d\leq20$, $0<x\leq10$. $M^I$ is at least one element selected from P, Si and Ge; and $M^{II}$ is at least one element selected from B, Ga, Al, In, Sn and Sb. Such magnetic thin film is capable of retaining a large coercive force regardless of its thickness and can be formed without the necessity of raising the base temperature during deposition of a magnetic layer.

4 Claims, 4 Drawing Sheets

Composition exclusive of oxygen Co$_{76}$Pt$_{21.5}$P$_{2.5}$ (atomic %)

| | Sample No. | Oxygen content wt. % | S mVp-p | N µVrms | SNR dB | C/N dB | O/W dB | Reso. % | PW50 nsec | Hc" Oe | Hk kOe | S | S* | Mr'/Mr" |
|---|---|---|---|---|---|---|---|---|---|---|---|---|---|---|
| Embodiments | 1 | 3.5 | 0.92 | 11 | 33 | 57 | -15 | 100 | 108 | 1250 | 7.5 | 0.29 | 0.33 | 0.66 |
| | 2 | 3.8 | 1.14 | 20 | 29 | 57 | -17 | 88 | 120 | 1460 | 1.3 | 0.56 | 0.69 | 0.39 |
| | 3 | 4.3 | 1.05 | 19 | 29 | 58 | -16 | 97 | 125 | 1630 | 1.3 | 0.60 | 0.68 | 0.37 |
| | 4 | 4.9 | 1.25 | 25 | 28 | 56 | -16 | 94 | 120 | 1380 | 1.3 | 0.58 | 0.67 | 0.36 |
| | 5 | 5.1 | 1.20 | 25 | 28 | 57 | -26 | 88 | 144 | 1600 | 2.0 | 0.63 | 0.60 | 0.38 |
| Comp. Ex. | 6 (CoM/Bl sputtering) | | 0.49 | 15 | 24 | 53 | -29 | 86 | 130 | 1250 | | | | |
| | 7 (CoNip plating) | | 0.48 | 11 | 27 | 54 | -31 | 83 | 125 | 1200 | | | | |

$Co_{76}Pt_{21.5}P_{2.5}$ (atomic %)
Oxygen content 4.0 (weight %)

FIG. 5

Composition exclusive of oxygen $Co_{76}Pt_{21.5}P_{2.5}$ (atomic %)

| | Sample No. | Oxygen content wt. % | S mV/p-p | N μVrms | SNR dB | C/N dB | O/W dB | Reso. % | PW50 nsec | Hc" Oe | Hk kOe | S | S* | Mr'/Mr" |
|---|---|---|---|---|---|---|---|---|---|---|---|---|---|---|
| Embodiments | 1 | 3.5 | 0.92 | 11 | 33 | 57 | -15 | 100 | 108 | 1250 | 7.5 | 0.29 | 0.33 | 0.66 |
| | 2 | 3.8 | 1.14 | 20 | 29 | 57 | -17 | 88 | 120 | 1460 | 1.3 | 0.56 | 0.69 | 0.39 |
| | 3 | 4.3 | 1.05 | 19 | 29 | 58 | -16 | 97 | 125 | 1630 | 1.3 | 0.60 | 0.68 | 0.37 |
| | 4 | 4.9 | 1.25 | 25 | 28 | 56 | -16 | 94 | 120 | 1380 | 1.3 | 0.58 | 0.67 | 0.36 |
| | 5 | 5.1 | 1.20 | 25 | 28 | 57 | -26 | 88 | 144 | 1600 | 2.0 | 0.63 | 0.60 | 0.38 |
| Comp. Ex. | 6 (CoNi/Bi sputtering) | | 0.49 | 15 | 24 | 53 | -29 | 86 | 130 | 1250 | | | | |
| | 7 (CoNip plating) | | 0.48 | 11 | 27 | 54 | -31 | 83 | 125 | 1200 | | | | |

MAGNETIC RECORDING MEDIUM

CROSS-REFERENCES TO RELATED APPLICATIONS

This application is related to application entitled "MAGNETIC RECORDING MEDIUM" in which the inventors are Kazuhiko Hayashi, Masatoshi Hayakawa and Koichi Aso assigned to the assignee of this application identified as U.S. Ser. No. 07/515,489.

BACKGROUND OF THE INVENTION

1. Field of the Invention

The present invention relates to a magnetic recording medium which could be used for video or audio, for example, and, more particularly, to a medium having an in-plane magnetizable film on its base.

2. Description of Related Art

In the conventional thin-film magnetic recording media, there are known some examples with magnetic thin films of alloys such as CoNi, CoP, CoPt and so forth which have isotropic properties with in-plane magnetization. Such magnetic thin films of CoNi and CoP have hard magnetic characteristics which are obtained by utilizing a columnar structure, including a saturation flux density Bs of about 10 kG and a coercive force Hc of about or less than 1 (kOe). Meanwhile, relative to the magnetic thin film of CoPt, an example is disclosed in Japanese Patent Laid-open No. 58 (1983)-200513, wherein the film indicates a great coercive force Hc of more than 1.5 (kOe) in a film thickness of less than 300Å, but in accordance with an increase of the film thickness, the coercive force Hc is rendered as low as 700 (Oe) or so although the saturation flux density Bs remains about 10 kG.

There are also known some other magnetic thin films of alloys such as CoCr, CoMo, CoV and CoRu each of which are adapted for perpendicular magnetization. Although a large coercive force is attained in each of such magnetic thin films if the base temperature is raised to 150° C. or so during deposition of the magnetic layer by sputtering or the like, the coercive force is as small as 300 (Oe) or so when the base temperature at the time of layer deposition is kept at room temperature. Consequently, it is impossible to use a low-cost base of polyethylene terephthalate (PET) which has low heat resisting properties.

OBJECT AND SUMMARY OF THE INVENTION

The present invention solves the problems mentioned. Its object is to provide an improved in-plane magnetic recording medium where a magnetic thin film capable of retaining a great coercive force Hc regardless of its thickness can be formed without the necessity of increasing the base temperature during deposition of a magnetic layer.

The magnetic recording medium of the present invention has a magnetic thin film with a composition which is expressed as $(Co_a Pt_b M_c^I M_d^{II})_{100-x} O_x$ (where a, b, c, d are atomic percent; and x if weight percent). In such composition, the following relationships exist:

$a+b+c+d=100$ $0<a$ $0<b\leq 50$ $0<c\leq 20$ $0\leq d\leq 20$ $0<x\leq 10$ $M^I$ is at least one element selected from P, Si and Ge; and $M^{II}$ is at least one element selected from B, Ga, Al, In, Sn and Sb. The magnetic thin film is so formed so as to retain a large coercive force without the necessity of raising the base temperature during deposition of a magnetic layer.

The above and other features of the present invention will be apparent in detail from the following description when considered with the illustrative accompanying drawings.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 5 is a table of evaluated characteristics of exemplary disks; and

DESCRIPTION OF THE PREFERRED EMBODIMENTS

In the present invention, the magnetic thin film has a composition expressed by:

$$(Co_a Pt_b M_c^I M_d^{II})_{100-x} O_x \qquad (1)$$

(in which a, b, c, d are atomic percent, and x is weight percent).

In the above composition (1), the following relationships exist:

$a+b+c+d=100$ $0<a$ $0<b\leq 50$ $0<c\leq 20$ $0\leq d\leq 20$ $0<x\leq 10$ (preferably $0<x\leq 6$)

Further in the composition (1), $M^I$ is at least one element selected from P, Si and Ge; and $M^{II}$ is at least one element selected from B, Ga, Al, In, Sn and Sb.

Hereinafter a description will be given of some exemplary embodiments which have been experimentally produced.

On a base composed of a slide glass plate, for example, a magnetic thin film was formed in each of the experiments by the use of a magnetron type sputtering apparatus during which the base temperature was maintained at room temperature. In this case, the sputtering conditions were selectively set as follows.

| | |
|---|---|
| Background vacuum degree | $1 \times 10^{-6}$ Torr or less |
| Base etching (inverse sputtering): | high frequency waves, 300W; 2 minutes |
| Sputtering power: | high frequency waves, 300W; |
| Sputtering gas pressure: | 20 mTorr |
| Sputtering gas flow rate: | approx. 180 SCCM |
| Film forming speed: | approx. 700Å/min. |
| Film thickness: | 500 to 5000Å |

The target used was such that three to six sector chips of Pt each having a thickness of 1 mm and a central angle of 6° were disposed on an alloy target element of Co $M^I M^{II}$ having a diameter of 4 inches and a thickness of 3 mm.

Figure 6:
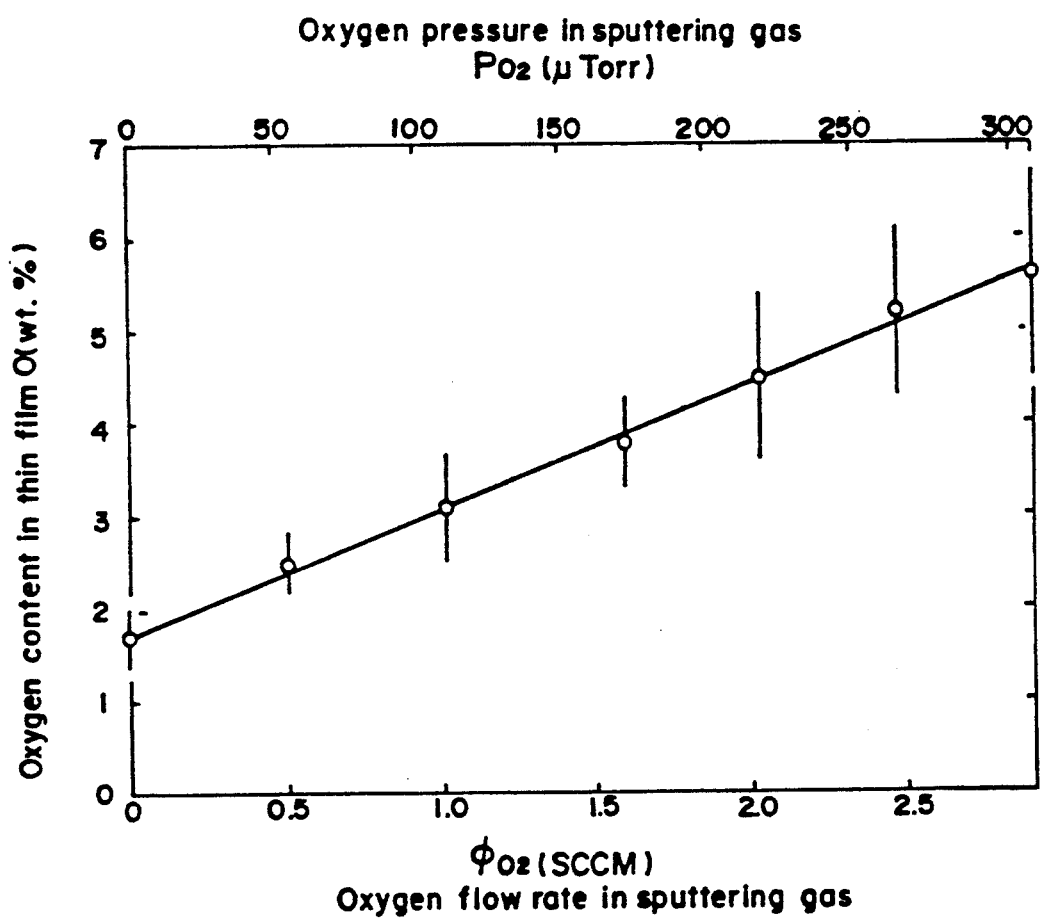
FIG. 6 is a graph which shows the relationship among the oxygen content in a magnetic thin film, the oxygen flow rate and the oxygen pressure in a sputtering gas.

Under the conditions mentioned, the relationship of FIG. 6 was confirmed among the oxygen flow rate $\phi O_2$ in the sputtering gas, the oxygen pressure $PO_2$ therein, and the oxygen content x in the formed thin film.

EMBODIMENT 1

By the above sputtering method and under the conditions mentioned, a magnetic thin film of $Co_{76}Pt_{21.5}P_{2.5}$ was formed (in a composition exclusive of oxygen). (Hereinafter each composition will be similarly expressed with exclusion of oxygen.) In this case, P was used as $M^I$ in the composition (1) with $c=2.5$ (atomic percent) and with no addition of $M^{II}$, i.e. $d=0$. The in-plane coercive force Hc" of the magnetic thin film was measured with changes of the oxygen flow rate $\phi O_2$ and the oxygen pressure $PO_2$ in the sputtering gas. The result of such measurement is represented by a curve (1) in FIG. 1, where a large value of the coercive force Hc" is indicated. By selectively setting the oxygen flow rate in the sputtering gas, the oxygen content x in the magnetic thin film of $Co_{76}Pt_{21.5}P_{2.5}$ was set to 4.0 percent (by weight). The inplane magnetization curve of the magnetic thin film thus obtained is as is graphically shown in FIG. 2, where the indicated value of $4\pi Ms$ is 13 kG or so. In this magnetic thin film, almost no change was observed magnetically over a thickness range of 500 to 5000Å.

EMBODIMENT 2

Figure 1:
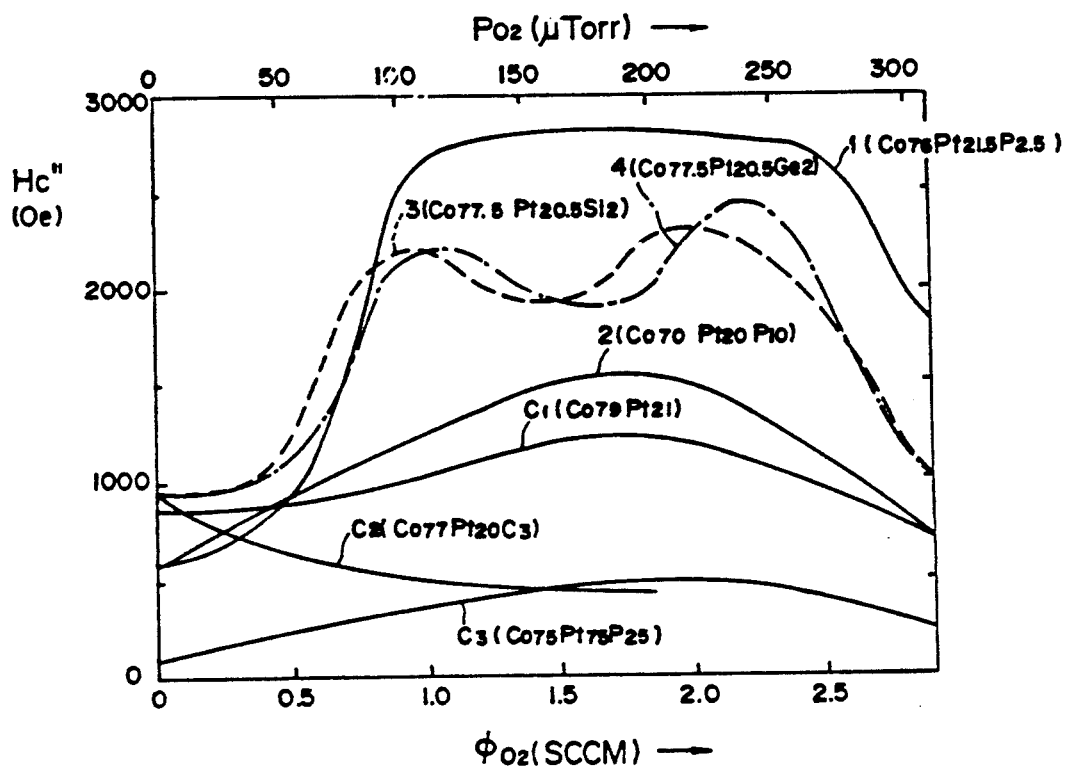
FIGS. 1, 3 and 4 are graphs which show curves of in-plane coercive forces obtained by measurements.
Figure 2:
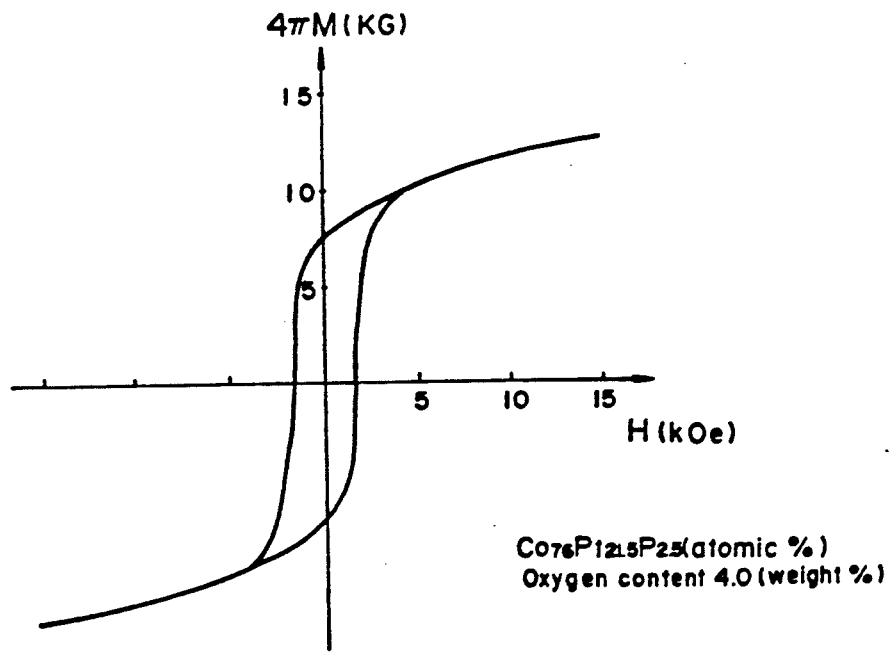
FIG. 2 is a graph of a magnetization curve.

The composition of Embodiment 1 was altered to obtain a magnetic thin film of $Co_{77}Pt_{20}C_3$. A curve (2) in FIG. 1 represents the result of measuring the coercive force Hc" under the same condition of $\phi O_2$ and $PO_2$ as in the foregoing case.

COMPARATIVE EXAMPLE 1

By the same method as employed in Embodiment 1, there was formed a magnetic thin film of $Co_{76}Pt_{21}$ which did not contain any $M^I$ or $M^{II}$ in composition (1). A curve C1 in FIG. 1 represents the result of measuring the coercive force Hc" under the same conditions of $\phi O_2$ and $PO_2$ for this example.

COMPARATIVE EXAMPLE 2

By the same method as employed in Embodiment 1, there was formed a magnetic thin film of $Co_{77}Pt_{20}C_3$ with carbon C added thereto but which did not contain any $M^I$ and $M^{II}$ in composition (1). A curve C2 in FIG. 1 represents the result of measuring the coercive force Hc" under the same conditions of $\phi O_2$ and $PO_2$.

COMPARATIVE EXAMPLE 3

By the same method as employed in Embodiment 1, there was formed a magnetic thin film of $Co_{55}Pt_{20}P_{25}$ where c in the aforementioned composition (1) was increased from 20 to 25 atomic percent. A curve C3 in FIG. 1 represents the result of measuring the coercive force Hc" under the same conditions of $\phi O_2$ and $PO_2$.

EMBODIMENT 3

By the same method as employed in Embodiment 1, there was formed a magnetic thin film of $Co_{77.5}Pt_{20.5}Si_2$ where Si was used as $M^I$ in the composition (1). A curve (3) in FIG. I represents the result of measuring the coercive force Hc" under the same conditions of $\phi O_2$ and $PO_2$.

EMBODIMENT 4

By the same method as employed in Embodiment 1, there was formed a magnetic thin film of $Co_{77.5}Pt_{20.5}Ge_2$ where Ge was used as $M^I$ in the composition (1). A curve (4) in FIG. represents the result of measuring the coercive force Hc" under the same conditions of $\phi O_2$ and $PO_2$.

As is apparent from comparisons of the curves (1) through (4) with the curves C1 through C3, the inplane coercive forces Hc' obtained in Embodiments 1 through 4 of the present invention are greater than those in the Comparative Examples 1 through 3.

EMBODIMENT 5

Figure 3:
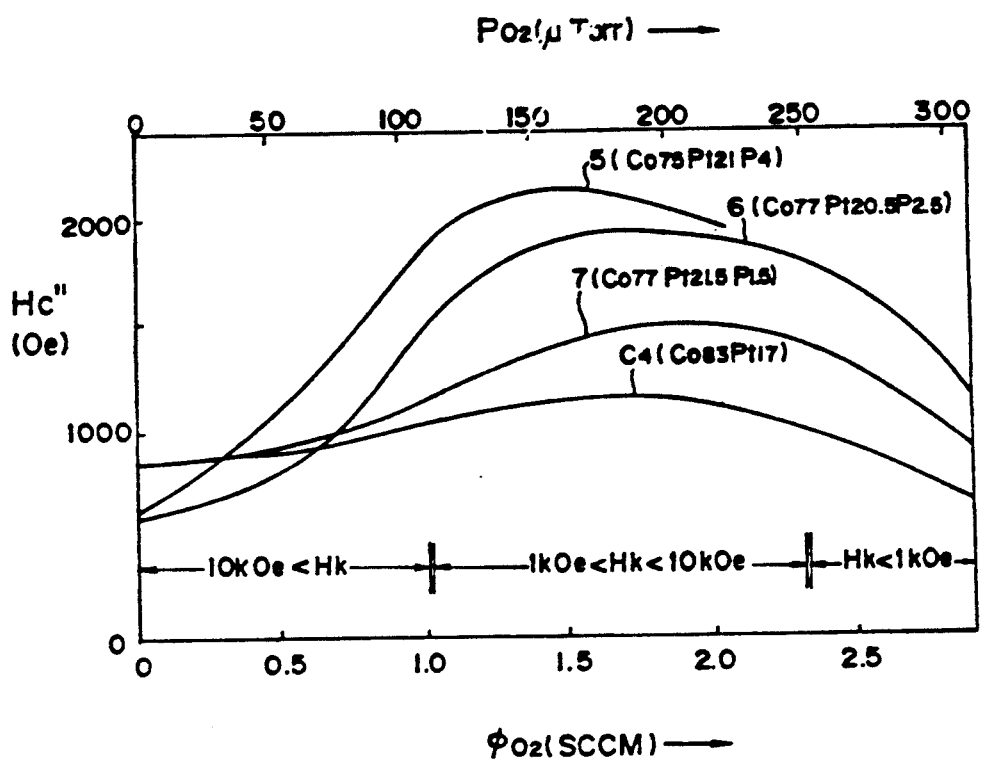

The composition of Embodiment 1 was altered to form a magnetic thin film of $Co_{75}Pt_{21}P_4$. A curve (5) in FIG. 3 illustrates the results of measuring the coercive force Hc' under the same conditions of $\phi O_2$ and $PO_2$.

EMBODIMENT 7

The composition of Embodiment 1 was altered to form a magnetic thin film of $Co_{77}Pt_{21.5}P_{1.5}$. A curve (7) in FIG. 3 illustrates the results of measuring the coercive force Hc" under the same conditions of $\phi O_2$ and $PO_2$.

COMPARATIVE EXAMPLE 4

By the same method as employed in Embodiment 1, there was formed a magnetic thin film of $Co_{83}Pt_{17}$ which did not contain any $M^I$ or $M^{II}$ in the aforementioned composition (1). A curve C4 in FIG. 3 illustrates the results of measuring the coercive force Hc" under the same conditions of $\phi O_2$ and $PO_2$.

EMBODIMENTS 8 THROUGH 12

Figure 4:
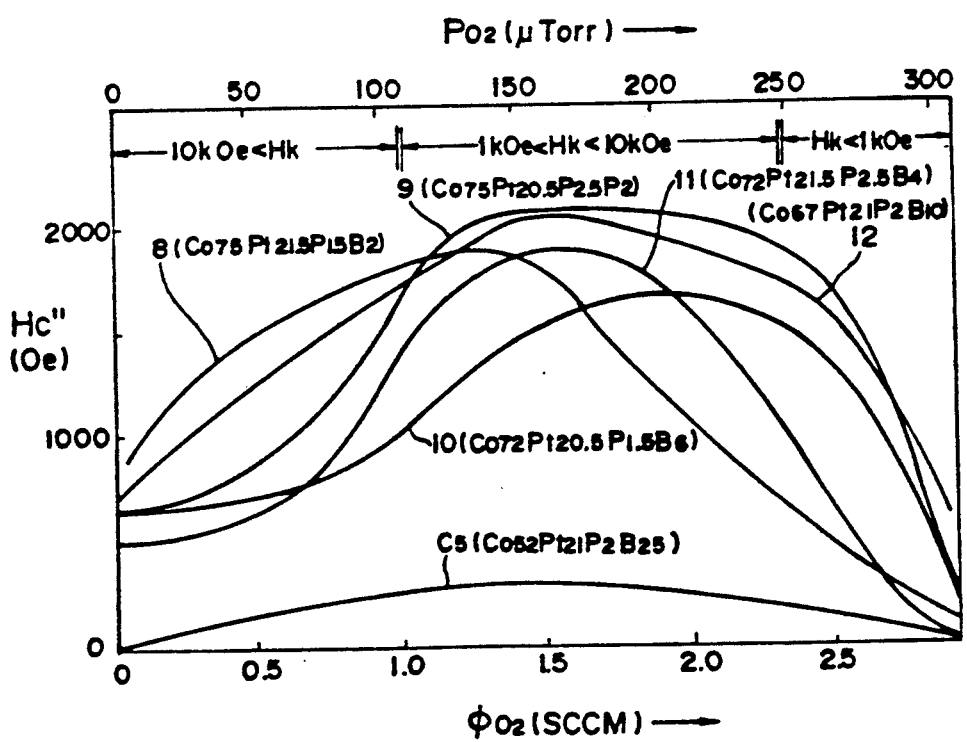

By the same method as was employed in Embodiment 1, there were formed magnetic thin films composed respectively of $Co_{75}Pt_{21.5}P_{1.5}B_2$ (Embodiment 8), $Co_{75}Pt_{20.5}P_{2.5}B_2$ (Embodiment 9), $Co_{72}Pt_{20.5}P_{1.5}B_6$ (Embodiment 10), $Co_{72}Pt_{21.5}P_{2.5}B_4$ (Embodiment 11), and $Co_{67}Pt_{21}P_2B_{10}$ (Embodiment 12) where B was used as $M^{II}$ in the aforementioned composition (1). Curves (8) through (12) in FIG. 4 represents the results of measuring the coercive force Hc" under the same conditions of $\phi O_2$ and $PO_2$.

COMPARATIVE EXAMPLE 5

Similarly to the Embodiments 8 through 12 which were composed of Co-Pt-P-B alloy, there was formed a magnetic thin film of $Co_{52}Pt_{21}P_2B_{25}$ where d in the composition (1) was increased from 20 to 25 atomic percent. A curve C5 in FIG. 4 represents the result of measuring the in-plane coercive force Hc' under the same conditions of $\phi O_2$ and $PO_2$. In this example, the coercive force Hc'' is considerably reduced as compared with the values of the curves (8) through (12) in FIG. 4.

The content x of oxygen O in the magnetic thin film, and hence the oxygen flow rate $\phi O_2$ and the oxygen pressure $PO_2$ in the sputtering gas also, exert some influence on the perpendicular anisotropic magnetic field Hk, as will be obvious from FIG. 6. The relationship to the magnetic field Hk is plotted along the abscissa in the graphic representations of FIGS. 3 and 4. In case the magnetic field Hk is excessively large, it causes an increase of noise in the in-plane magnetic recording medium; whereas any extremely small magnetic field Hk causes a reduction of the output. It is therefore desirable that the content x (weight percent) of oxygen O be selected so as to satisfy the condition $0 < x \leq 10$ and, more preferable, $0 < x \leq 6$.

EMBODIMENT 13

Hard disks were produced as samples (Nos. 1 through 5) where the oxygen content x (weight percent) was changed in a magnetic thin film of $Co_{76}Pt_{21.5}P_{2.5}$, and the characteristics thereof were evaluated. The results of such evaluation are shown in a table of FIG. 5 together with the comparative examples. The device used for evaluating such hard disks was driven at 3.33 MHz and 3600 rpm, and the data were obtained on the circumference of a radius of 27 mm. In the table of FIG. 5, S is the peak-to-peak average reproduced output voltage ($mV_{p-p}$) on a track, and N is the noise power ($\mu Vrms$) which is given by $$N = \sqrt{\int_0^{6MHz} (N_c^2 - N_E^2) \, df/\Delta f}$$

(where $N_c$ is a spectrum exclusive of a carrier at a carrier recording time; and $N_E$ is a spectrum obtained upon erasure with DC).

Further in FIG. 5: SNR is $20 \log_{10}(S_{o-p}/N)$ (where $S_{o-p} = S/2$); C/N is a spectrum ratio of 3.33 MHz to 2.33 MHz; O/W is an erasure rate signal of 1.25 MHz when such signal is overwritten at 3.33 MHz; Reso is a resolution of 3.33 MHz reproduced signal voltage to 1.25 MHz reproduced signal voltage; $PW_{50}$ is the pulse duration corresponding to a half width of an isolated wave; S is a squareness ratio; S* is a coercive-force squareness ration; and M'/M'' is a ratio of perpendicular residual magnetization to the in-plane magnetization.

In the comparative examples shown in the table of FIG. 5, the sample No. 6 is a hard disk with a magnetic thin film of CoNi layer deposited on a Bi under-layer by sputtering; and the sample No. 7 is a hard disk with a magnetic thin film composed of a CoNiP layer formed by plating.

The magnetic characteristics mentioned in this specification were measured by the use of a sample vibrating type magnetometer with the application of a maximum magnetic field of 17 kOe, and the film compositions were analyzed by a combination of electron beam probe micro-analysis (BPMA) and inductively coupled plasma analysis (ICP). The oxygen concentration was measured in comparison with a standard sample whose content was definitely known, by a combination of secondary ion mass spectrometry (SIMS) and electron beam probe micro-analysis (BPMA).

In each of the above examples, the magnetic thin film is composed of Co-Pt-P-O alloy, Co-Pt-Si-O alloy, Co-Pt-Ge-O alloy or Co-Pt-P-B-O alloy. However, in the composition (1), some other element such as Ga, Al, In, Sn or Sb may be used as $M^{II}$. It has also been confirmed that, in case two or more elements are used as $M^I$ and $M^{Ii}$, a large coercive force and satisfactory saturated magnetization can still be achieved in any in-plane magnetizable film formed by establishing the aforementioned relationships among a, b, c, d (atomic percent) and x (weight percent) as follows:

$a+b+c+d=100$ $0<a$ $0<b\leq 50$ $0<c\leq 20$ $0<d\leq 20$ $0<x\leq 10$

Thus, according to the in-plane magnetic recording medium of the present invention, a large coercive force and satisfactory saturated magnetization can be attained, and it is applicable to any tape, sheet or disk magnetic recording media. Particularly when the present invention is applied to a hard disk, remarkable advantages are achievable with regard to low noise and high output characteristics, as listed in the table of FIG. 5. In this case, there is no necessity of heating a base at the time of forming a magnetic thin film by sputtering or the like, so that the degree of freedom in selecting a base material is increased to consequently allow the use of a low-cost material.

Furthermore, as shown in the sample No. 6, an underlayer is no longer needed to eventually facilitate manufacture which has another advantage of lowering the production costs. In addition, since the coercive force is substantially independent of the film thickness, it becomes possible to enhance the high output characteristics by increasing the film thickness.

Although the invention has been described with respect to preferred embodiments it is not to be so limited as changes and modifications can be made which are within the full intended scope of the invention as defined by the appended claims.

We claim as our invention:

1. A magnetic thin film for use as a recording medium having a composition of:

$(Co_a\ Pt_b\ M_c^I\ M_d^{II})_{100-x}\ O_x$ in which a, b, c, d are atomic percent; and x is weight percent, wherein $a+b+c+d=100$ $0<a$ $0<b\leq 50$ $0<c\leq 20$ $0<d\leq 20$ $0 < x \leq 10$ and $M^I$ is at least one element selected from P, Si and Ge; and $M^{II}$ is at least one element selected from Ga and In.

2. A magnetic recording medium having, on a base thereof, a magnetic thin film of a composition expressed as $$(Co_a Pt_b M_c^I M_d^{II})_{100-x} O_x$$

in which a, b, c, d are atomic percent; and x is weight percent,
wherein $$a+b+c+d=100$$

$0 < a$ $0 < b \leq 50$ $0 < c \leq 20$ $0 < d \leq 20$ $0 < x \leq 10$ and $M^I$ is at least one element selected from P, Si and Ge; and $M^{II}$ is at least one element selected from Ga and In.

3. A magnetic thin film according to claim 1, wherein the thickness thereof is in a range of 500 to 5000 angstroms.

4. A magnetic thin film according to claim 1, wherein the content x of oxygen is selectively set as $0 < x \leq 6$ weight percent.

* * * * *